Patented Nov. 12, 1929

1,735,432

UNITED STATES PATENT OFFICE

FRITZ GÜNTHER, OF LUDWIGSHAFEN-ON-THE-RHINE, GERMANY, ASSIGNOR, BY MESNE ASSIGNMENTS, TO GENERAL ANILINE WORKS, INC., OF NEW YORK, N. Y., A CORPORATION OF DELAWARE

MANUFACTURE OF QUINONE DERIVATIVES

No Drawing. Application filed October 5, 1925, Serial No. 60,674, and in Germany October 22, 1924.

I have found that by the interaction of aromatic diazo compounds and quinones new compounds possessing valuable properties are produced. The reaction proceeds with an evolution of nitrogen and with a substitution of the nucleus of the quinone molecule by the residue to which the diazo group was initially attached giving rise to a product which still has a quinone nature. The diazo compound may be derived from an aromatic amine containing no further substituents or substituted by sulfonic acid or nitro or substituted amino groups or halogen atoms and so on, and the term diazo compound comprises also diazo-azo-bodies and compounds containing the diazo group once or several times as well. The products obtained in accordance with my present invention are valuable intermediates for the manufacture of dyestuffs.

The following examples will serve to further explain the nature of my invention which, however, is not limited to these examples. The parts are by weight.

Example 1

93 parts of aniline are diazotized in the usual manner. An excess of sodium acetate is then added to the solution of the diazo compound which, thereupon, is poured into a solution of benzoquinone prepared by dissolving 110 parts of benzoquinone in alcohol and pouring into water. A strong development of nitrogen takes place and the diazo compound is decomposed after a short time.

The reaction product separates from the solution as a yellow precipitate which when crystallized from alcohol, forms yellow leaflets of a melting point of 114° C.; it represents phenyl-benzoquinone corresponding to the formula

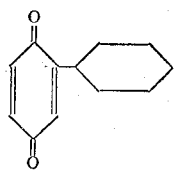

Example 2

An ice-cold solution prepared by diazotizing 127 parts of para-chlor-aniline is mixed with an excess of sodium acetate and introduced, while stirring, into a cold solution of 115 parts of benzoquinone in 1000 parts of alcohol and 8000 parts of water. A disengagement of nitrogen begins at once and chlor-phenyl-benzoquinone corresponding to

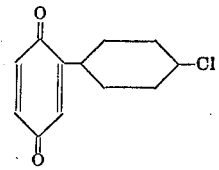

is precipitated as a yellow powder and with good yield. It is readily soluble in alcohol and dissolves in concentrated sulfuric acid violet blue.

Example 3

A diazonium salt solution prepared from 150 parts of para-amino-acetanilide is caused to run into a cold solution of 115 parts of benzoquinone in aqueous alcohol containing an excess of sodium acetate. An orange yellow product is separated with good yield while nitrogen is developed, which product corresponding to the formula

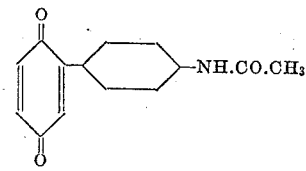

can be recrystallized from aqueous alcohol of about 50 per cent and dissolves in concentrated sulfuric acid claret red.

Example 4

A diazonium solution prepared from 137 parts of anthranilic acid and containing an excess of sodium acetate is mixed with an aqueous solution of 115 parts of benzoquinone. Nitrogen is disengaged and a yellow body precipitated with good yield which body after being purified by dissolving in warm benzol and precipitating with petrol ether, dissolves in concentrated sulfuric acid with a yellow color. It corresponds to the formula

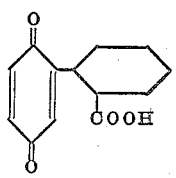

By means of a sodium bisulfite solution containing aqueous alcohol it is reduced to an uncolored hydroquinone derivative.

Example 5

30 parts of para-amino-azo-benzene sulfonic acid sodium salt are diazotized in the usual manner; the solid diazonium compound formed is filtered off, washed with water and introduced into a solution of 12 parts of benzoquinone in dilute alcohol. By slowly adding sodium bicarbonate solution, the reaction which proceeds with a disengagement of nitrogen can be completed. A brown crystalline compound, difficultly soluble in cold water, which compound has the formula

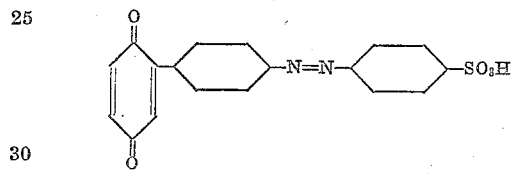

separates out from the solution with good yield. It is a quinone derivative which with hot aqueous sodium bisulfite solution gives a yellow solution of the corresponding hydroquinone.

I claim:

1. The process of manufacturing compounds of a quinone nature which comprises acting on quinones with a diazotized aromatic amine.

2. As new articles of manufacture, benzoquinone derivatives of the following general formula:

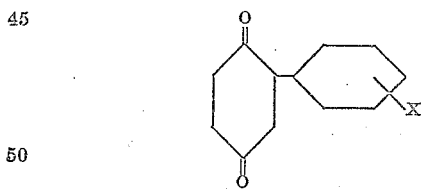

wherein X stands for one or more than one substituents.

In testimony whereof I have hereunto set my hand.

FRITZ GÜNTHER.